United States Patent [19]
Kozlov et al.

[11] 3,804,107
[45] Apr. 16, 1974

[54] DEVICE FOR PREPARATION OF A DIALYZING SOLUTION

[76] Inventors: Jury Gotlibovich Kozlov, Khoroshovskoe Shosse, 11, kv. 47; Adolf Eserovich Khaitlin, ul. Molodtsova, 9, kv. 7; Galina Konstantinovna Lisitsina, Bolshevistsky per. 13/3, kv. 13, all of Moscow, U.S.S.R.

[22] Filed: Apr. 5, 1972

[21] Appl. No.: 241,277

[52] U.S. Cl............ 137/101.31, 222/135, 417/395
[51] Int. Cl............................................ F16k 19/00
[58] Field of Search .. 137/99, 99.5, 101.21, 101.31; 417/395; 222/135

[56] References Cited
UNITED STATES PATENTS

| | | | |
|---|---|---|---|
| 3,072,462 | 1/1963 | Anderson | 417/395 X |
| 2,090,069 | 8/1937 | Richardson et al. | 137/101.31 X |
| 3,033,218 | 5/1962 | Callen | 137/99.5 |
| 3,121,614 | 2/1964 | Galster | 417/395 UX |
| 2,653,552 | 9/1953 | Geeraert | 417/395 X |

Primary Examiner—Robert G. Nilson
Attorney, Agent, or Firm—Eric H. Waters

[57] ABSTRACT

A device for the preparation of dialyzing solutions comprises a number of metering units, one for each solution component, each including a reservoir for storing a component, communicating via a metering element with a further, common reservoir for mixing the components. The metering element in each unit has two spaces divided by a flexible impermeable diaphragm, each space accommodating a perforated limiting plate. These spaces communicate through inlet valves in each unit with a pump delivering the respective component from its storing reservoir and, through outlet valves, with the common, further reservoir. The units are fitted with sensors indicating the flow rate of the solution components.

5 Claims, 3 Drawing Figures

DEVICE FOR PREPARATION OF A DIALYZING SOLUTION

The present invention relates to medical equipment and more specifically it relates to devices for the preparation of dialyzing solutions used in the apparatuses for extra-renal purification of bloood, for example in "artificial kidney"to apparatuses.

Usually, the dialyzing solution is prepared from water and concentrated solutions of the required substances by means of metering pumps of a constant or variable capacity, whose disadvantages lie in high demands for the wear resistance of their materials, workmanship, and relative arrangement of individual parts of the pump working chamber, dependence of the metering accuracy on the pressure of the fluid being metered and a loss of reliability in case of mechanical impurities in the fluids handled.

Also known in the art are devices for the preparation of dialyzing solutions employing the principle of discrete metering of the solution components, such as a device which consists of a reservoir for the components of the dialyzing solution, said reservoir connected via a metering element with a reservoir for mixing the dialyzing solution components. The metering element is made in the form of a metering tank with a level-measuring tube opening into the atmosphere, said tank communicating through an inlet valve with a reservoir for storing the components and through an outlet valve, with a reservoir for mixing said components.

This device is free of the disadvantages inherent in the devices with metering pumps; however, the accuracy of the formula of the dialyzing solution in this device is also affected adversely by the leakage of the components through the inlet and outlet valves. Another disadvantage of this device lies in the impossibility of preparing the dialyzing solution while the metering tank is being filled with the solution components.

Continuous preparation of the dialyzing solution can be ensured only by the consecutive operation of two devices of this kind, which complicates the design and doubles the weight and size of the device. In view of these disadvantages the possibilities for using the known device for the preparation of the dialyzing solutions in the apparatuses for extrarenal purification of blood, e.g., for hemodialysis, are limited.

An object of the present invention is to provide a device for the preparation of dialyzing solutions which continuous and automatic supply of portions of the solution components into a mixing reservoir and which control of possible component leaks through the inlet and outlet valves in the course of metering of each component by a corresponding metering element.

Another object of the invention is to control leaks of the solution components through the inlet and outlet valves in the course of metering of each component by a corresponding metering element.

This object is accomplished by providing a device for the preparation of dialyzing solutions, comprising a number of reservoirs for storing solution components, in respective metering units corresponding in number to the components to be mixed. The reservoir in each unit communicates via a metering element with a further, common reservoir for mixing the solution components. According to the invention, each metering element is a closed chamber divided into two spaces by a flexible impermeable diaphragm with concave perforated limiting plates arranged on both sides of the diaphragm with a clearance relative to the inside walls of the chamber. The spaces communicate through a system of inlet valves with a pump for delivering the component from its storage reservoir to the metering element and, through a system of outlet valves, with a sensor for measuring the flow rate of the components. The outlet of the sensor communicates with the mixing reservoir. It is recommended that the spaces of the metering elements communicate with the inlet and the outlet valves through channels located in the upper parts of the walls of the metering element chambers.

The component flow-rate sensors may be made in the form of transparent tubes installed approximately vertically and accommodating floats which rise when the respective components flow through said tubes; besides, there are transmitters installed outside the tubes to indicate the lower positions of the floats.

The limiting plates and the diaphragms may have a spherical shape.

It is advisable that the surfaces of the limiting plates facing the diaphragm be provided with radial and with concentric slots, connecting holes in the limiting plates.

This device ensures continuous and automatic preparation of dialyzing solutions, control of the pressure-tightness of the inlet and outlet valves, and integrity of the diaphragm. This device guarantees a high accuracy and repetition of metering.

Now the invention will be described in detail by way of example with reference to the accompanying drawings in which.

Figure 1:
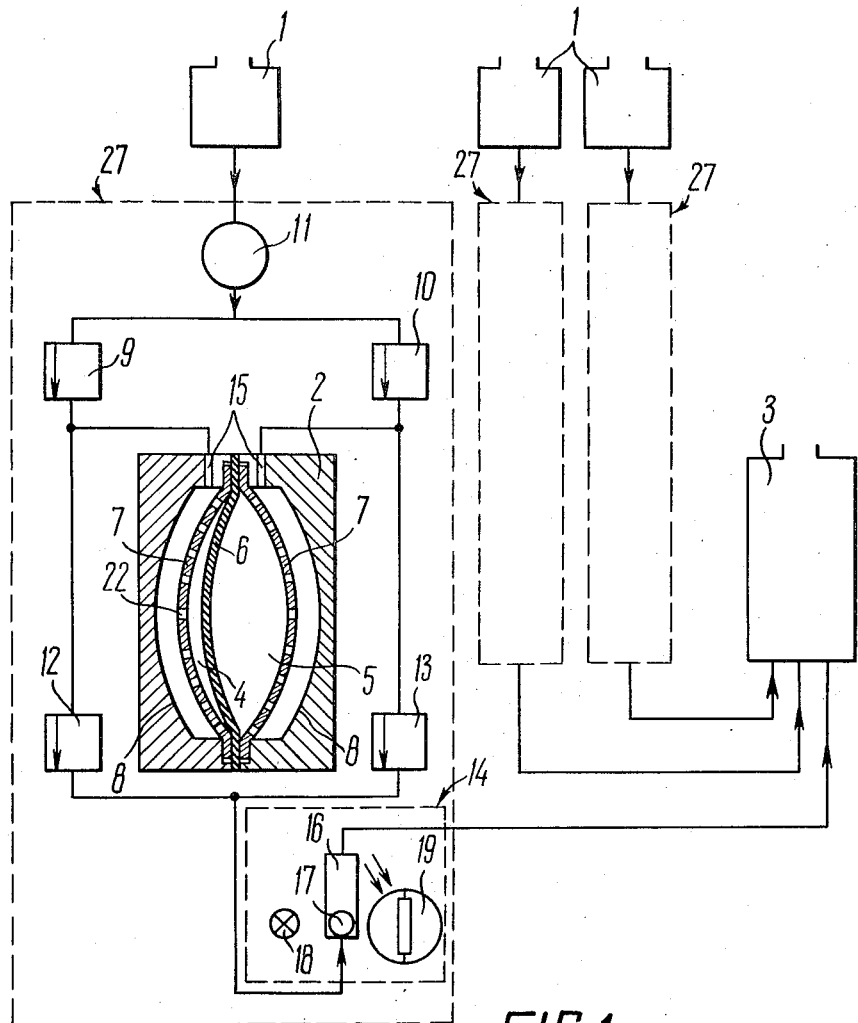
FIG. 1 is a schematic view of an exemplary embodiment of the inventive device for the preparation of dialyzing solutions.

The inventive device for the preparation of dialyzing solutions comprises a number of storage reservoirs 1 (FIG. 1) for the storage of components of the dialyzing solutions, communicating through metering elements 2 with a further reservoir 3 for mixing the components. One unit is shown with all particulars while two others, as a matter of example, appear schematically. Numeral 27 denotes individual metering units forming part of the device. The number of units depends on the number of components to be stored and mixed, that will constitute the completed dialyzing solutions.

Each metering element 2 is a closed chamber divided by a respective flexible impermeable diaphragm 6 into spaces 4 and 5. Located on both sides of the diaphragm 6 are concave perforated limiting plates 7 set with a clearance relative to the inner walls 8 of the chamber. The spaced 4 and 5 communicate through inlet valves 9 and 10 with a pump 11 for delivering the component of the dialyzing solution from the reservoirs 1 while through outlet valves 12 and 13 they communicate with a respective sensor 14 for measuring the flow rate of the dialyzing solution component. The outlets of the sensors 14 communicate with the mixing reservoir 3.

The spaces 4 and 5 of each metering element 2 communicate with the inlet valves 9 and 10 and outlet valves 12 and 13 through channels 15 in the upper parts of the chamber walls of the metering element 2 which ensures expulsion of air from the spaces 4 and 5.

The flow-rate sensors 14 are nearly vertical transparent tubes 16 containing floats 17 which rise when the respective solution component flows through the tubes 16, and have transmitters for sensing the lowermost positions of the floats 17, said transmitters being installed outside the tubes 16 and consisting, say, of sources of light 18 and light detectors 19, both being arranged on the same optical axis.

Each light detector 19 is equipped with a light-sensing device, such as for example, a photoresistor, an amplifier and a valve controlling means (a trigger), the trigger having two positions, "1" and "2:" when set in positon "1" the valves 9, 13 are open while valves 10, 12 are shut, and conversely, when the trigger is set in position "2," the valves 9, 13 are shut while the valves 10, 12 are open.

Figure 2:
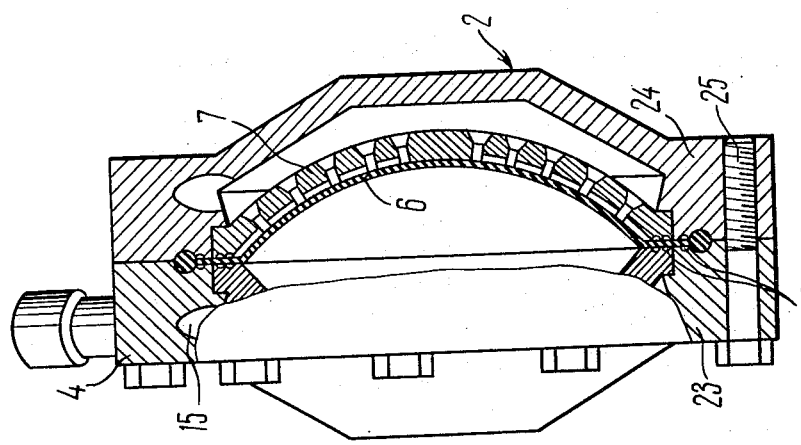
FIG. 2 shows a partly cut away metering element of the device.

The limiting plates 7 and the diaphragms 6 may be shaped as segments of a sphere, as shown in FIG. 2.

Figure 3:
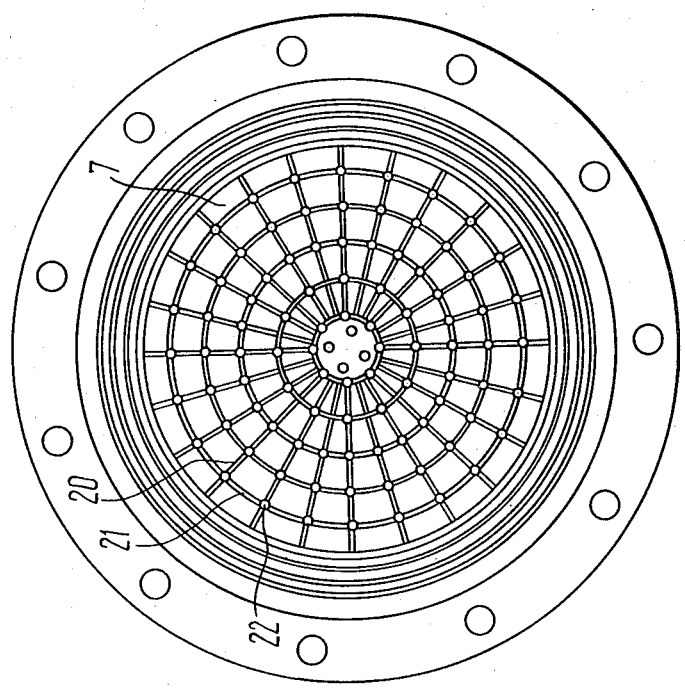
FIG. 3 is a view of a metering-element limiting plate, viewed from the side of a diaphragm.

The surfaces of the limiting plates 7 facing the diaphragms 6 are provided with radial slots 20 (FIG. 3) and concentric slots 21 interconnecting holes 22 of the plates 7.

It is recommended that the body of each metering element 2 (FIG. 2) consist of two halves 23 and 24 held together by bolts 25 and that the edges of each diaphragm 6 be clamped between these body halves 23 and 24. It is also desirable that the surfaces of the body halves 23 and 24 and those of the limiting plates 7 clamping the edges of the diaphragm 6 should be provided with concentric slots 26.

This provides for the pressure-tightness of the spaces 4, 5 of the chambers of the metering elements 2.

As mentioned before, the number of the reservoirs 1 (FIG. 1) and of the metering units 27 consisting of metering elements 2; valves 9, 10, 12, 13, pumps 11 and flow-rate sensors 14 corresponds to the required number of components of the dialyzing solution. The device for the preparation of dialyzing solutions functions as follows.

Each component of the dialyzing solution flows from its reservoir 1 into the corresponding metering elements 2. Let us assume that the valve trigger of the light detector 19 is set in position "1" and the valves 9 and 13 in the initial position of the metering element 2 are open, the valves 10 and 12 are closed and the membrane 6 is pressed against the left-hand (in the drawing) limiting the plate 7.

The component is thus delivered by the pump 11 from the reservoir 1 through the open inlet valve 9 and the holes 22 of the plate 7 into the space 4 of the metering element 2 and moves the membrane 6 which, in turn, acts on the solution component contained in the space 5 of the metering element 2, forcing the component through the holes 22 of the right-hand plate 7 through the open outlet valve 13 and the tube 16 into the mixing reservoir 3. The float 17 rises in the tube 16, the luminous flux of the source of light 18 acts on the light detector 19, which gives a signal about the movement of a portion of the dialyzing solution component.

When the entire portion of the component is forced out of the space 5, the diaphragm 6 comes to bear against the inner surface of the right-hand limiting plate 7, the flow of the solution component through the tube 16 is discontinued, the float 17 drops and cuts off the illumination of the light detector 19, which gives a signal that the delivery of a portion of the component is finished. The other metering units 27 function similarly.

When the delivery of all the components of the dialyzing solution is finished, illumination of the light detectors 19 of the metering units 27 is interrupted, which leads to a change of the light detector valve trigger position (the light detector 19 valve trigger moves from position "1" into position "2"), the valves 9 and 13 are shut, while the valves 10 and 12 are opened. The component is then delivered by the pump 11 from the reservoir 1 through the open inlet valve 10 and the holes 22 of the plate 7 into the space 5 and moves the diaphragm 6 which acts on the component contained in the space 4. The component is forced from the space 4 into the mixing reservoir 3 through the holes 22 of the plate 7, through the open outlet valve 12 and the tube 16.

As the flow of all the components discontinues, illumination of the light detectors of all the metering units 27 is interrupted, which leads to a change of the light detector valve trigger position (the light detector 19 valve trigger moves from the position "2" into position "1"), the valves 10 and 12 are shut, while the valves 9 and 13 are opened and the operating cycle of the device is repeated over again. The dialyzing solution is completed in the reservoir 3 by mixing all the components.

If the components of the dialyzing solution leak through the inlet valves 9 and 10 and the outlet valves 12 and 13 or through the diaphragm 6, the flow of the component in the corresponding metering element 2 will not stop after the diaphragm 6 comes in contact with the inside surface of the limiting plate 7, the float 17 will not drop and this will give a signal preventing the repetition of the solution-preparing cycle. Thus, the pressure-tightness of the inlet valves 9, 10 and the outlet valves 12 and 13 the integrity of the diaphragm 6 are automatically checked during the operation of the device.

The portion of each component depends on the volume of the space between the inside surfaces of the limiting plates 7.

The accuracy of metering each component is ensured by a constant volume of the space between the inside surfaces of the plates 7 and by a tight contact of the diaphragm 6 with the inside surfaces of the plates 7. The use of the same space for metering ensures equality of the component portions.

Besides, metering accuracy is improved by the system of radial and concentric slots 20, 21 (FIG. 3), ensuring a better and more stable contact of the diaphragms 6 (FIG. 1) with the inside surfaces of the plates 7, and by the spherical shape of the diaphragms 6 and the plates 7.

The device according to the invention is simple and economical, it is small and light, at the same time ensuring continuous supply of portions of the dialyzing solution components.

We claim:

1. A device for preparation of a dialyzing solution, comprising: at least two reservoirs for storing components of the dialyzing solution, which are subsequently to be mixed; at least two pumps for the delivery of the components, communicating with said reservoirs; at least two metering elements with walls defining respective closed chambers; each metering element having a flexible impermeable diaphragm dividing its chamber into two respective metering spaces; concave perforated limiting plates installed in each metering space with a clearance relative to said walls; said pumps and said metering elements forming at least two metering units, the number thereof being equal to the number of the components being handled; each metering unit having at least two inlet valves communicating its associated pump with said metering spaces and at least two outlet valves whose inlets communicate with said metering spaces, and having respective outlets; at least two component flow-rate sensors for said metering units, for controlling actuation of said inlet and said outlet valves, the inlets of said sensors communicating with said outlets of the outlet valves, said sensors having respective outlets; and a further, common reservoir for mixing the components of the dialyzing solution, having at least two inlets communicating with said outlets of the sensors.

2. The device as defined in claim 1, wherein said metering spaces communicates with said inlet and said outlet valves through channels in the upper part of said walls defining said closed chambers.

3. The device as defined in claim 1, wherein said sensors include each a substantially vertical transparent tube, a float located in said tube and rising as a result of the flow of the respective solution components through said tube, and a transmitter installed outside of said tube, for sensing the lowermost position of said float.

4. The device as claimed in claim 1, wherein said limiting plates and said diaphragms are shaped as segments of a sphere.

5. The device as defined in claim 1, wherein the surfaces of said plates facing said diaphragms are provided with radial and with concentric slots connecting the perforations in said plates.

* * * * *